May 17, 1955 G. J. COONEY 2,708,333
BANKING DISC HARROW
Filed June 7, 1950 2 Sheets-Sheet 1
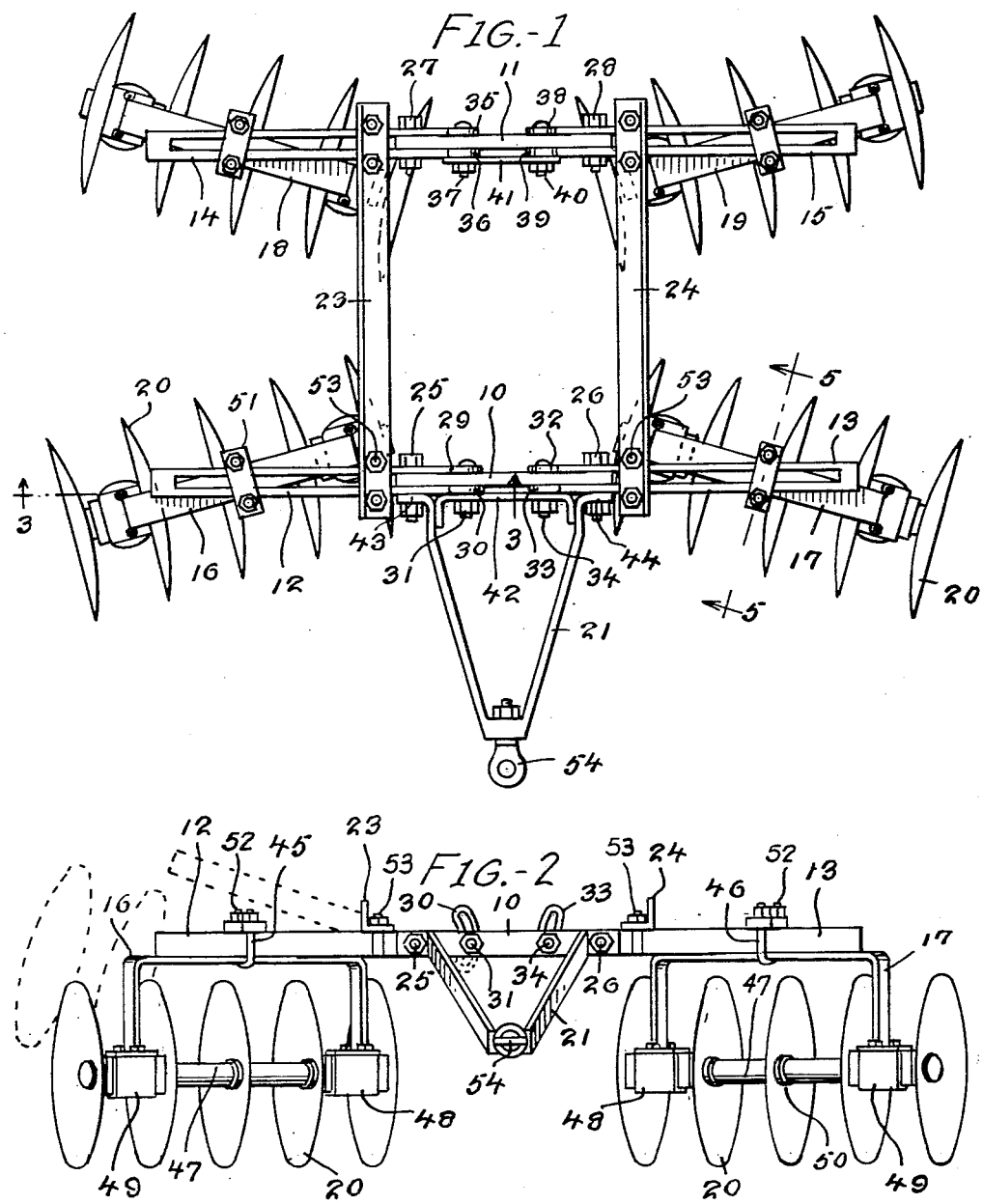
INVENTOR.
GEORGE J. COONEY
BY Victor J. Evans & Co.
ATTORNEYS May 17, 1955  G. J. COONEY  2,708,333
BANKING DISC HARROW
Filed June 7, 1950  2 Sheets-Sheet 2
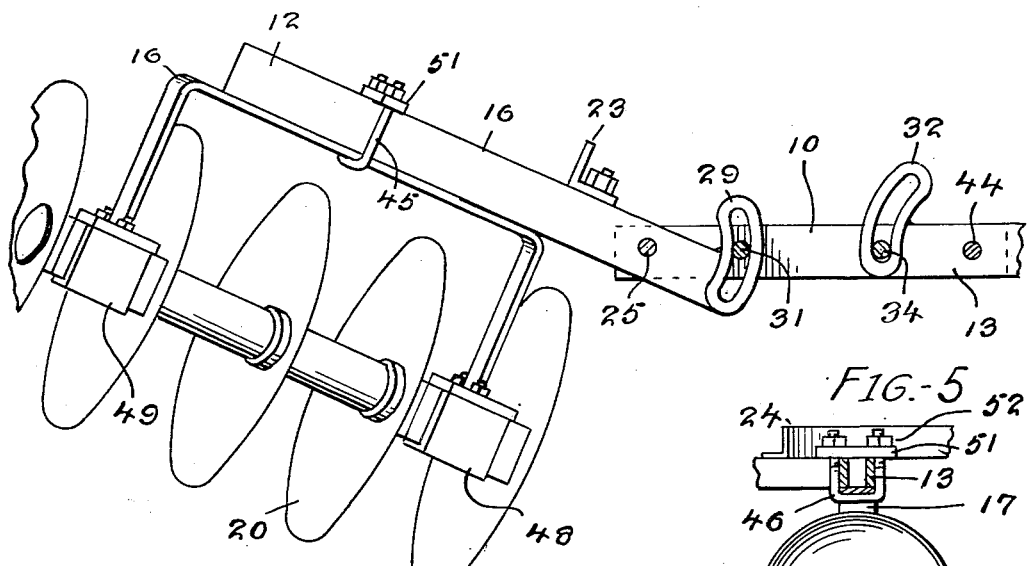
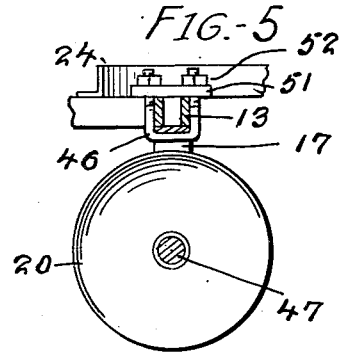
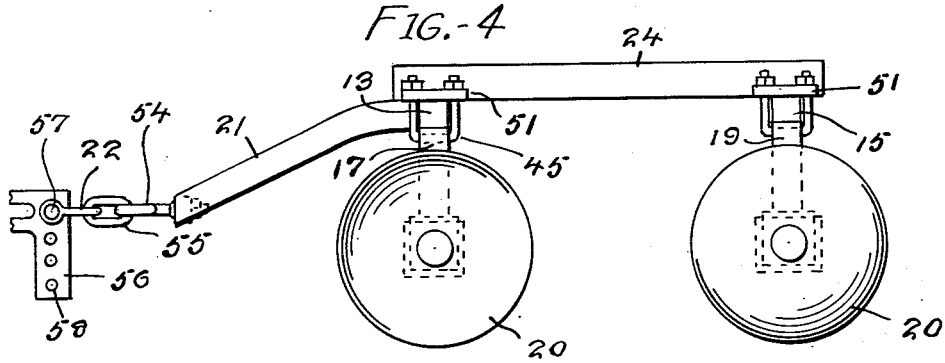
INVENTOR.
GEORGE J. COONEY
BY Victor J. Evans & Co.
ATTORNEYS United States Patent Office 2,708,333
Patented May 17, 1955

2,708,333

BANKING DISC HARROW

George J. Cooney, Mount Holly, N. J.

Application June 7, 1950, Serial No. 166,680

1 Claim. (Cl. 55—83)

This invention relates to a disc harrow having a plurality of pivotally mounted and hinged disc sections whereby the horizontal beam may be set to ridge the row or bank the plant or bush whereby it is possible to work the center of a row flat or hollow.

The purpose of this invention to to provide a disc harrow having a plurality of harrow sections carried by transversely disposed parallel horizontal beams so that the sections of the beams carrying the discs may be set to extend upwardly and whereby the sections of the discs may be set at different angles to the perpendicular axis of the harrow.

Various types of construction have been used for adjusting the position of shafts on which discs are carried whereby the discs may be set at different angles to work the ground, but it has been found difficult to set the discs with the axis of a shaft on which the discs are carried extended upwardly so that the discs may be used for banking the soil around plants or bushes and also for forming rows or ridges. With this thought in mind this invention contemplates a disc harrow having a pair of spaced transversely disposed beams with the ends of the beams hinged for upward movement in relation to the intermediate sections thereof and with gangs of discs mounted on shafts carried by U-shaped frames and wherein the U-shaped frames are pivotally mounted on the ends of the transverse beams.

The object of this invention is, therefore, to provide means for mounting gangs of discs on a harrow frame with the gangs divided into sections and with each section pivotally mounted on a hinged section of the frame.

Another object of the invention is to provide a disc harrow frame having laterally extended arms with the arms pivotally connected to central or intermediate sections and with gangs of discs pivotally mounted to swing about vertical axis on the outer ends of the arms.

A further object of the invention is to provide a gang disc harrow having means for adjusting the discs horizontally and also vertically which is of a simple and economical construction.

With these and other objects and advantages in view the invention embodies a horizontally disposed harrow frame having a hitch on the forward end of a yoke extended from the frame with the frame formed with transversely disposed beams having longitudinally extended slots therein, with arms pivotally mounted on the ends of the beams and with discs adjustably mounted in the outer ends of the arms.

Other features and advantages of the invention will appear from the following description taken in connection with the drawings wherein:

Figure 1 is a plan view of the harrow.

Figure 2 is a front elevational view of the harrow.

Figure 3 is a cross section taken on line 3—3 of Figure 1 on an enlarged scale, illustrating a disc section at one side of the harrow in an upwardly extended position.

Figure 4 is a side elevational view of the harrow with the discs in aligned positions.

Figure 5 is a detail showing a section taken on line 5—5 of Figure 1 illustrating the mounting of the disc sections on the arms of the harrow.

Referring now to the drawings wherein like reference characters denote corresponding parts the banking disc harrow of this invention includes a horizontally disposed frame having a transversely disposed forward bar 10, a similar rear bar 11, beams 12 and 13 hinged to the ends of the bar 10, beams 14 and 15 hinged to the ends of the bar 11, U-shaped yokes 16 and 17 carried by the beams 12 and 13, respectively, U-shaped yokes 18 and 19 carried by the beams 14 and 15, respectively, discs 20 carried by the yokes, and a hitch yoke 21 having a clevis 22 at the forward end.

The beams 12 and 14 are connected by a longitudinally positioned angle bar 23 and the beams 13 and 15 are connected by a similar bar 24. Each of the beams 12, 13, 14 and 15 is formed with two parallel arms which straddle the ends of the bars 10 and 11 and the bars of the beam 12 are pivotally mounted on one end of the bar 10 by a bolt 25. The bars of the beam 13 are pivotally mounted on the opposite end of the bar 10 by a bolt 26 and the bars of the beams 14 and 15 are pivotally mounted on the ends of the bar 11 by bolts 27 and 28, respectively.

The inner ends of the bars of the beam 12 are provided with yokes 29 and 30 through which the beam is clamped in adjusted position by a bolt 31. Similar yokes 32 and 33 are provided on the bars of the beam 13 and the inner end of this beam is held by a bolt 34. The bolts 31 and 34 extend through the bar 10 and rigidly clamp the extending beams 12 and 13 in adjusted positions, as illustrated in Figure 3.

The bars of the beam 14 are provided with yokes or brackets 35 and 36 that are clamped by a bolt 37 in the bar 11 and the bars of the beam 15 are provided with similar yokes 38 and 39 which are clamped to the bar 11 by a bolt 40. A plate 41 is extended over the inner ends of the bolts 37 and 40 to facilitate clamping the yokes of the beams 14 and 15 in position. A similar plate 42 extends over the bolts 31 and 34 to facilitate clamping the inner ends of the beams 12 and 13 and flanges 43 and 44 on the inner ends of the sides of the yoke 21 are held by the bolts 25 and 26.

The disc units or sections are similar and the same reference numerals will be used for the parts thereof except the yokes through which the shafts of the disc units are mounted on the arms extended from the ends of the bars 10 and 11.

The disc units are carried by inverted U-shaped yokes and the yokes 16 and 17 of the forward discs are clamped to the arms 12 and 13 by U-bolts 45 and 46, respectively. It will be understood that although U-bolts are illustrated in the drawings the yokes may be pivotally mounted on the beams by bolts or attaching devices of different types and designs.

The discs 20 are mounted on shafts 47 and the shafts are journaled in bearings 48 and 49 in the ends of the U-shaped yokes and suitable locating and spacing elements 50 are provided on the shafts.

Bars 51 are provided under nuts 52 of the U-bolts and the angle bars 23 and 24 are secured to the beam by bolts 53.

An eye bolt 54 is provided at the forward end of the yoke 21 and the clevis 22 is attached thereto by a link 55. The clevis 22 is attached to a hitch 56 by a bolt 57 and the hitch is provided with a plurality of spaced bolt holes 58 whereby the hitch is vertically adjustable to compensate for the draw bar of a tractor or the like through which the harrow is attached.

With the parts arranged in this manner the beams extended from the ends of the transverse bars may be adjusted upwardly, as illustrated in Figure 3 to bank plants or bushes and the beams with the discs suspended thereon are adjustable up to an angle of 45 degrees. As illustrated in Figure 1 the disc units may be clamped on the arms or beams with the shafts aligned or extended straight outwardly or with the shafts slightly inclined as illustrated in Figure 1. By this means the gangs of discs may be set to ridge the row or bank the plants or bushes to any desired angle.

It will be understood that modifications may be made in the design and arrangement of the parts without departing from the spirit of the invention.

What is claimed is:

In a disc harrow, a pair of bars arranged in spaced parallel relation with respect to each other, a beam hingedly connected to each end of each of said bars, a U-shaped yoke dependingly carried by each of said beams, a shaft supported by each of said yokes, a plurality of spaced discs mounted on each of said shafts, a hitch member connected to one of said bars, a clevis mounted in the front end of said hitch member, a pair of spaced parallel angle bars arranged beyond the ends of said first named bars and extending between said beams and secured thereto, said beams each including a pair of spaced parallel arms straddling said first named bars, and a securing element pivotally connecting said arms to said first named bar, and means embodying bolt and nut assemblies and a plate for maintaining said beams immobile in their adjusted positions, said plates being shorter than said first named bars, an open bracket secured to the inner end of each of said beams, securing elements extending through said brackets and into engament with said first named beams, said brackets having their lower ends flush with the bottom of said beams and their upper ends projecting above the upper surface of said beams, said brackets being arcuate in shape.

References Cited in the file of this patent

UNITED STATES PATENTS

| | | |
|---|---|---|
| 872,957 | Mohr et al. | Dec. 3, 1907 |
| 1,669,080 | Dewend | May 8, 1928 |
| 1,862,550 | Rector | June 14, 1932 |
| 2,143,193 | Goble | Jan. 10, 1939 |
| 2,152,347 | Ferraro | Mar. 28, 1939 |
| 2,266,590 | Dyrr | Dec. 16, 1941 |
| 2,336,079 | Eustis et al. | Dec. 7, 1943 |
| 2,385,637 | Mitchell et al. | Sept. 25, 1945 |